(12) United States Patent
Zetts

(10) Patent No.: US 7,212,726 B2
(45) Date of Patent: May 1, 2007

(54) SYSTEM AND METHOD OF PROCESSING MPEG STREAMS FOR FILE INDEX INSERTION

(75) Inventor: John Mark Zetts, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 09/860,700

(22) Filed: May 18, 2001

(65) Prior Publication Data

US 2002/0048450 A1   Apr. 25, 2002

Related U.S. Application Data

(60) Provisional application No. 60/232,893, filed on Sep. 15, 2000.

(51) Int. Cl.
*H04N 5/91* (2006.01)
(52) U.S. Cl. .................. 386/68; 386/111; 386/112
(58) Field of Classification Search .................. 386/46, 386/95, 98, 111, 112, 125, 126
See application file for complete search history.

(56) References Cited

U.S. PATENT DOCUMENTS

| | | | |
|---|---|---|---|
| 5,455,684 A * | 10/1995 | Fujinami et al. ............. | 386/111 |
| 5,568,274 A | 10/1996 | Fujinami et al. ............. | 386/107 |
| 5,651,087 A | 7/1997 | Nagano et al. ................ | 386/51 |
| 5,812,791 A | 9/1998 | Wasserman et al. ... | 395/200.77 |
| 5,923,627 A * | 7/1999 | Miwa et al. ................... | 386/70 |
| 5,949,953 A * | 9/1999 | Shirakawa et al. ............ | 386/70 |
| 5,991,502 A * | 11/1999 | Kawakami et al. .......... | 386/109 |
| 6,009,237 A * | 12/1999 | Hirabayashi et al. ........ | 386/111 |
| 6,055,565 A | 4/2000 | Inai .............................. | 709/218 |
| 6,539,164 B2 * | 3/2003 | Shirakawa et al. ............ | 386/70 |

FOREIGN PATENT DOCUMENTS

| | | |
|---|---|---|
| EP | 0817480 A1 | 1/1998 |
| JP | 06-164522 | 6/1994 |
| WO | WO 98/39891 | 9/1998 |

* cited by examiner

*Primary Examiner*—Huy Nguyen
(74) *Attorney, Agent, or Firm*—Sandra M. Parker, Esq.

(57) ABSTRACT

A method, apparatus and article of manufacture is provided for automatic insertion of a compressed GOP offset table within a previously encoded MPEG video file, for frame accurate random access of each individual video frame in play-from-offset mode. The method creates a compressed GOP offset table having an entry for each GOP header of every video packet of the MPEG video file, and modifies the MPEG video file by inserting the compressed GOP offset table before the MPEG video file as at least one padding packet, thereby preserving the MPEG compliance and compressed audio/video data of the MPEG video file. The method further has a step for estimating a number of padding packets needed for the GOP offset table, thereby limiting the MPEG video file reading to a single read.

15 Claims, 15 Drawing Sheets

SYSTEM AND METHOD OF PROCESSING MPEG STREAMS FOR FILE INDEX INSERTION

RELATED APPLICATIONS

This application claims the benefit of U.S. Provisional Patent Application entitled "Apparati and Methods For Processing MPEG Streams" by the same inventor, Ser. No. 60/232,893, filed on Sep. 15, 2000.

The present invention is related to co-pending applications entitled: "System and Method of Processing MPEG Streams For Timecode Packet Insertion", Ser. No. 09/850,201, filed on May 7, 2001 and issued as a U.S. Pat. No. 6,738,427 on May 18, 2004, "System and Method of Timecode Repair and Synchronization in MPEG Streams", Ser. No. 09/850,253, filed on May 7, 2001, and "System and Method of Processing MPEG Streams For Storyboard and Rights Metadata Insertion", Ser. No. 09/850,522, filed on May 7, 2001 and issued as a U.S. Pat. No. 6,760,042 on Jul. 6, 2004, all assigned to the assignee of the present invention and fully incorporated herein by reference.

BACKGROUND OF THE INVENTION

1. Field of the Invention

The present invention relates generally to the compression, cataloging and viewing of full motion videos and, more particularly, to the processing of compressed video data.

2. Description of Related Art

The infrastructure and process required to create and operate a video archive in the digital domain are well known in the broadcast video industry. The archiving process generally begins by digitizing and compressing the analog video using MPEG-1 or MPEG-2 compression, then moving the compressed video file to a long term storage. To preserve the contribution quality of the video, broadcasters generally select a high compressed bitrate (i.e., 15–40 Mbps), which allows the original video to be recovered with relatively high fidelity in spite of the lossiness of the MPEG compression scheme.

The high bitrate of the compressed video, however, presents considerable problems to the broadcaster's local area network and computer workstation infrastructure, when the video must be distributed for viewing and post-production work. The high network bandwidth and the amount of time required to transfer the assets throughout the plant places an upper limit on the number of concurrent transfers and severely constrains productivity. In response to this bandwidth problem, broadcasters create an additional copy of the video at a much lower compressed bitrate (i.e., 1.5–4 Mbps). This low bitrate file, referred to as a 'proxy' or 'browse' file, enables users to quickly download the video or to view it directly on computer monitors by utilizing a streaming video server. To facilitate the viewing of video assets outside the local area network, a second proxy file is often encoded at a very low bitrate (56–1000 Kbps), for streaming over low speed terrestrial lines.

After ingestion of the video, the next step in the archiving process is to create an entry for the video in the video library catalog. This entry contains metadata, which is information pertinent to the video. The contents and format of a video catalog record, normally broadcaster unique, facilitate the search and retrieval of video clips within the broadcaster's video library. Presently, there are commercially available video catalog applications (catalogers) that will automatically extract from an MPEG-1 or MPEG-2 video file metadata, such as closed caption text and the text of the actual audio program, obtained via speech recognition technology. Catalogers further extract metadata from the video by performing scene change analysis and creating a bitmap of the first frame after each cut or major scene transition. These bitmaps, referred to individually as a 'thumbnail' or collectively as a storyboard, are considered essential metadata because they enable the end user to determine very quickly the video content. Absent the storyboard, the end user is forced to view the video or, at a minimum, fast forward through a video to find the desired video segment.

A common feature of video catalog applications is to allow the end user, when viewing the catalog record and metadata, to play the proxy file by double clicking on any thumbnail. The MPEG player, nested inside the application's window, begins to play the video from the timecode associated with the thumbnail. The player performs this function by sending to the streaming video server a play-from-offset request. A limitation of the MPEG syntax permits a video to be randomly accessed only at the Group of Pictures (GOP) header level. More specifically, in order to start playing randomly, within an MPEG file, the player must decode a pack header to obtain system timing, a system header to identify the audio and video streams, a sequence header to parse the video format, a sequence extension for further video format information, and a GOP header to begin decoding on an 'I' frame.

Unlike other block based compression algorithms, the frame size in MPEG is variable, so frames must be located by sequentially reading the file. To implement the play-from-offset capability, MPEG players commonly have to perform a rough calculation based on the multiplex bitrate. For example, to start playing at offset 00:00:10:15 (10 seconds, 15 frames) into an 8 Mbps video, the player will use the following formula:

$$\text{byte offset} = \left((\text{bytes/second}) * \text{seconds}\right) + \left(\frac{(\text{bytes/second})}{(\text{frames/second})} * \text{number of frames}\right)$$

$$10{,}500{,}000 = ((8{,}000{,}000/8)*10) + (((8{,}000{,}000/8)/30)*15)$$

Since this formula is only an approximation, and the player has no knowledge of where the GOP boundaries are, the player will arbitrarily subtract a number of bytes from this result in order to ensure playing is begun prior to the target frame. This crude method is aesthetically unpleasing because up to 15 frames of corrupted video may be played out before the encoder is able to construct a full, error-free frame of video. Additionally, this formula assumes the video was compressed at a constant bitrate. If a variable bit rate compression scheme was used, there is no correlation between bitrate, file size and video duration.

Another conventional technique of implementing play-from-offset is for the video server to build an index file containing the offset of each GOP in the video. The player then passes the streaming server a time offset, and the server performs a table lookup to determine the file byte offset. The drawback of this method is that the server must build and manage an additional file for each video. If the video MPEG file is migrated to a near-line tape storage, both files must to written to and restored from tape. This also complicates the inter-server transfer of videos commonly performed to maintain load balancing or import video files from other content providers.

Yet another problem with a server-based implementation of play-from-offset occurs due to the fact that the user requested frame will most likely not coincide with a GOP boundary. The player has no knowledge of the starting frame timecode, so it cues on the first picture of the GOP and the end user is forced to single step to the intended frame. This behavior is not acceptable for the broadcast video industry. Non-linear video devices are expected to cue on the target frame with minimal delay.

Therefore, there is a need for a system and method for automatic insertion of a file index information within an existing MPEG video file, so that an MPEG player has a priori knowledge of GOP SMPTE timecodes and file offsets, for precise play-from-offset capability. This system and method should be able to perform without use of a separate index file, in a manner that ensures the MPEG video file will continue to be decodable, without error, by any compliant MPEG decoder engine.

SUMMARY OF THE INVENTION

The foregoing and other objects, features, and advantages of the present invention will be apparent from the following detailed description of the preferred embodiments which makes reference to several drawing figures.

One preferred embodiment of the present invention is a method for automatic insertion of a compressed GOP offset table within a previously encoded MPEG video file, for frame accurate random access of each individual video frame in play-from-offset mode. The method creates a compressed GOP offset table having an entry for each GOP header of every video packet of the MPEG video file, and modifies the MPEG video file by inserting the compressed GOP offset table before the MPEG video file as at least one padding packet, thereby preserving the MPEG compliance and compressed audio/video data of the MPEG video file. The method further has a step for estimating a number of padding packets needed for the GOP offset table, thereby limiting the MPEG video file reading to a single read. Some compressed GOP offset table padding packets are preceded by a pack header having a system clock reference (SCR). The padding packet further has a standard PES header, an offset table signature, a starting timecode field, and a starting GOP address field.

Each GOP header entry further has a field for number of frames within a prior GOP, and a field for a GOP address offset having an offset address of the pack header corresponding to the GOP header. These fields are used for re-synchronizing an MPEG decoder clock prior to decoding of the GOP offset table, and for reconstructing the timecode and address offset of each GOP header during decompression and decoding, by adding the number of frames and address offset of each GOP header entry to the starting timecode and starting GOP address, respectively, and thus allowing random access of each individual video frame in play-from-offset mode. The method further has a step for adjusting the SCR backwards in time, after the GOP offset table insertion, for maintaining proper system timing.

Another preferred embodiment of the present invention is an apparatus implementing the above-mentioned method embodiment of the present invention.

Yet another preferred embodiment of the present invention is a program storage device readable by a computer tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention is directed to a method, a program storage device, and system for processing an MPEG-1 or MPEG-2 video file to automatically insert into an existing MPEG file a file index information in form of a GOP offset table, containing a GOP SMPTE timecode and a GOP byte offset, for precise play-from-offset capability, without modifying or altering the original compressed video/audio data, while preserving full MPEG compliance, so that the broadcaster's normal ingest and cataloging procedures remain unchanged. The invention is capable of inserting the GOP offset table into any existing compliant MPEG-1 system stream, MPEG-2 program stream or MPEG-2 transport stream, without regard to MPEG encoder/decoder manufacturer.

Furthermore, the preferred embodiments of the present invention are able to make the existence of the GOP offset table transparent to MPEG decoders not enabled to extract it, and minimize the increased length and playout delay of the modified MPEG file. They can detect and recover from bit errors introduced while streaming the MPEG video over a telecommunications network, and process the MPEG video file in an efficient manner, requiring only a single read of the file. Furthermore, they perform without use of a separate index file, in a manner that ensures the MPEG video file will continue to be decodable, without error, by any compliant MPEG decoder engine.

Figure 1:
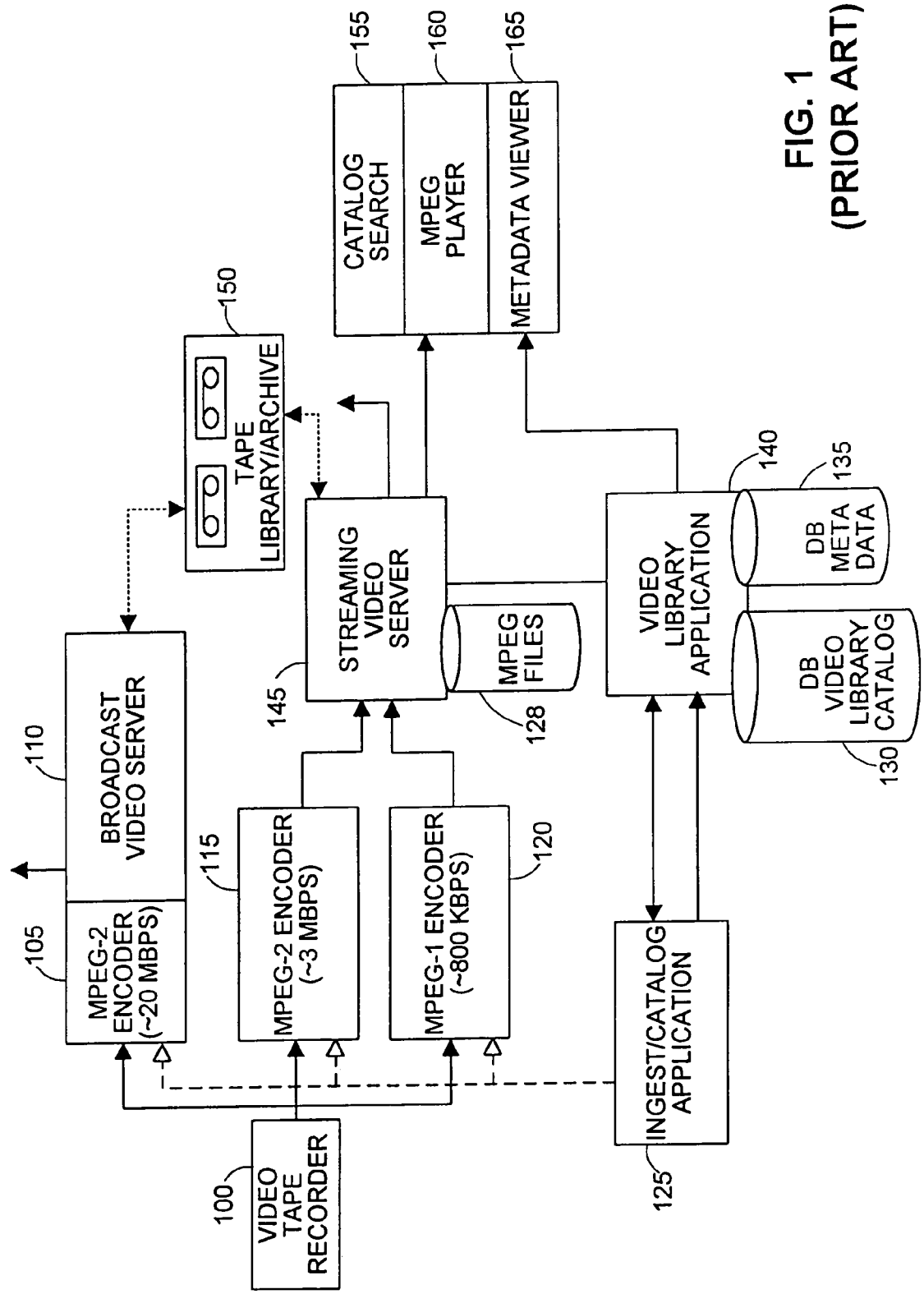
FIG. 1 is an illustration of a conventional video ingest/cataloging system, according to a prior art.

FIG. 1 is an illustration of a conventional video ingest/cataloging system, according to a prior art. In FIG. 1, a video tape recorder 100 provides a source video for encoding. An ingest/catalog application 125 controls three MPEG encoders 105, 115, 120 in parallel, which produce a high-resolution video file and two proxies. The high resolution MPEG encoder 105 is integrated with a broadcast video server 110. As the ingest/catalog application 125 creates MPEG files 128 and associated metadata 135, catalog records in a video library catalog 130 are created or updated using a video library application 140. The cataloging and indexing of the video files enables subsequent search and retrieval.

Upon completion of encoding, the compressed files are moved onto a streaming video server 145 which is capable of file FTP or isochronous streaming to MPEG decoders/players 160. All video content is copied to a tape library/archive 150 for long term storage, and retrieved as necessary. The end user locates the content in the video library catalog 130 via a catalog search engine 155. The candidate catalog records returned in the search query are individually examined using a cataloger/metadata viewer 165. The full video or any part thereof may be viewed via the MPEG player 160.

Figure 2:
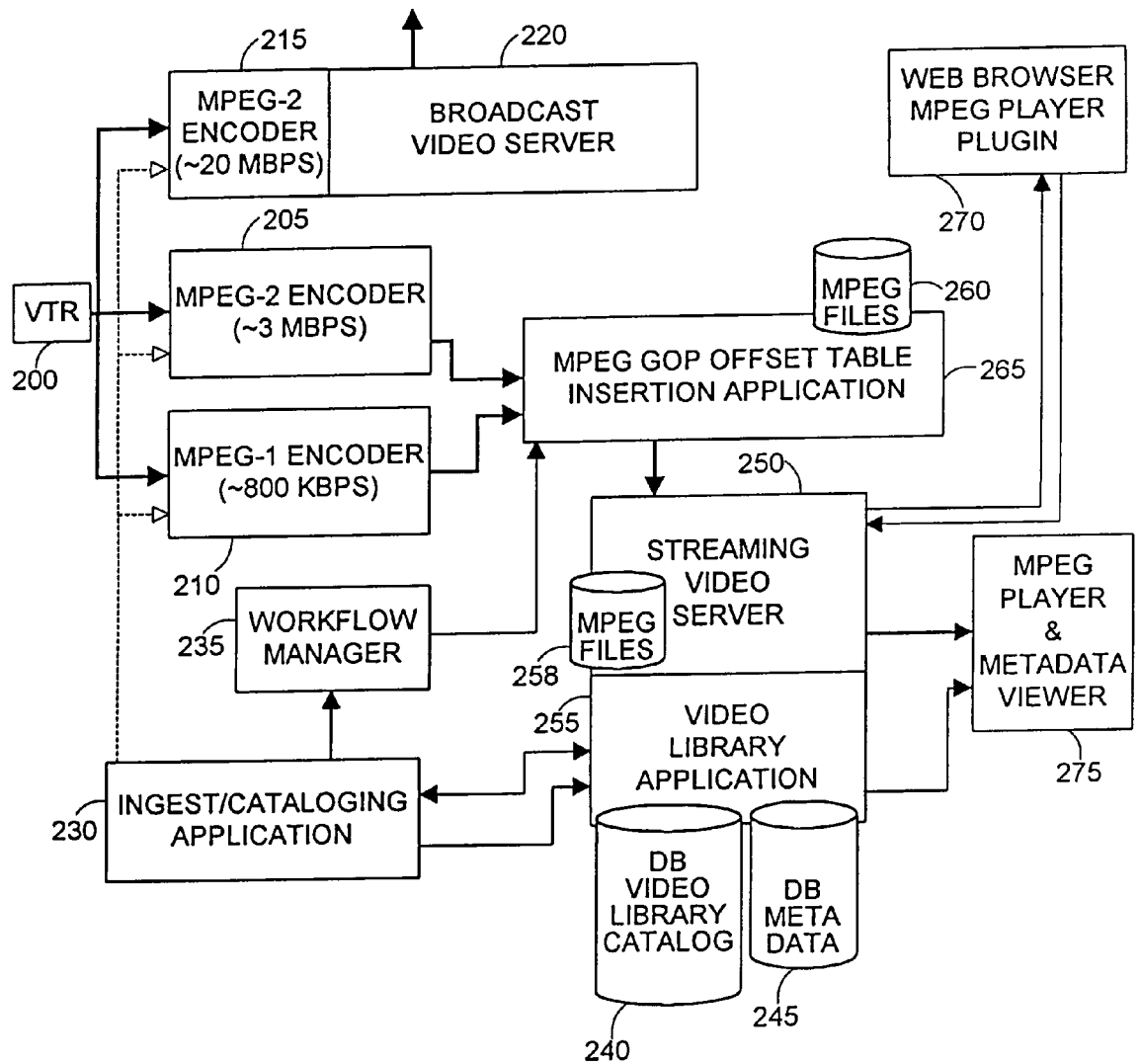
FIG. 2 depicts the placement of the GOP offset table insertion application within an existing video cataloging system, according to a preferred embodiment of the present invention.

FIG. 2 is an illustration of a video ingest/cataloging system, according to the preferred embodiments of the present invention. The method and system of the present invention processes an existing MPEG-1 or MPEG-2 video file, and inserts a GOP offset table as the starting packet(s) of the stream. The GOP offset table is inserted as MPEG padding packets (for example, with a start code 0xBE). Padding packets are normally created by an encoder to pad the stream with extraneous, null data to maintain a constant bit rate. Padding packets are normally discarded by the MPEG decoder. The present invention uniquely marks these inserted GOP offset table padding packets with a signature that is recognized by any MPEG decoder enabled to extract the GOP offset table.

The GOP offset table padding packets are inserted without remultiplexing the MPEG stream and without modifying presentation timestamps (PTS), decode timestamps (DTS), system reference clocks (SCR) or any other MPEG data structure of the original video file. The resultant video file remains fully MPEG compliant and the inserted GOP offset table has no adverse effect on the operation of other MPEG hardware or software decoders. The GOP offset table insertion technique functions on any MPEG compliant program stream or transport stream file, independent of encoder vendor.

When the file is decoded by the associated MPEG player, the GOP offset table is extracted and stored in memory for the duration of time the file remains the active video. When random jumps in video location are commanded by the user, the player locates the nearest preceding GOP header employing an efficient binary search that references the timecode stored in the GOP offset table. If the video is being isochronously streamed by a video server, the player sends the address of the target GOP header to the server, which then updates the current file read pointer and restarts the video stream. If the player is decoding a locally stored MPEG file, the player makes the corresponding file read pointer update itself The present invention provides advantage over prior art by precluding the need for creation and management of a separate file containing the GOP indexing data. The embedded GOP offset table becomes a permanent part of the proxy video files that reside in the video archive. Further advantage is gained from avoidance of a need for modification of the MPEG server software.

Referring now to FIG. 2, proxy files produced by two low resolution encoders 205, 210 are stored on a hard drive 260 of a separate machine 265, to be processed by a GOP offset insertion application (GOTIA) 265 according to the preferred embodiments of the present invention. The invocation of the GOTIA 265 is automatically triggered by a workflow manager 235, upon receiving notification from an ingest/cataloging application 230 that encoding operation has been completed. As the ingest/cataloging application 230 signals a job completions to the workflow manager 235, the workflow manager in turn invokes the GOTIA 265, which appends the GOP offset table packet(s) to the MPEG video file, then copies the modified MPEG file 258 to a streaming video server 250.

FIG. 2 also illustrates a video tape recorder 200, which provides a source video for encoding. The ingest/catalog application 230 controls three MPEG encoders 205, 215, 210 in parallel, which produce a high-resolution video file and two proxies. The high resolution MPEG encoder 215 is integrated with a broadcast video server 220, for playout to air. As the ingest/cataloging application 230 creates metadata files 245, catalog records in a video library catalog 240 are created or updated using a video library application 255. The cataloging and indexing of the video files enables subsequent search and retrieval.

The full proxy video file from the encoder 205, or any part thereof, and the retrieved catalog records and metadata returned in the search query may be viewed via the MPEG player and metadata viewer 275, which can send a play-at-offset request to the streaming video server 250. The system of FIG. 2 may also incorporate a Web browser MPEG player plugin 270, which can send a play-at-offset request to the streaming video server 250, and receive from it a streaming video originally encoded by the proxy encoder 210.

Figure 3:
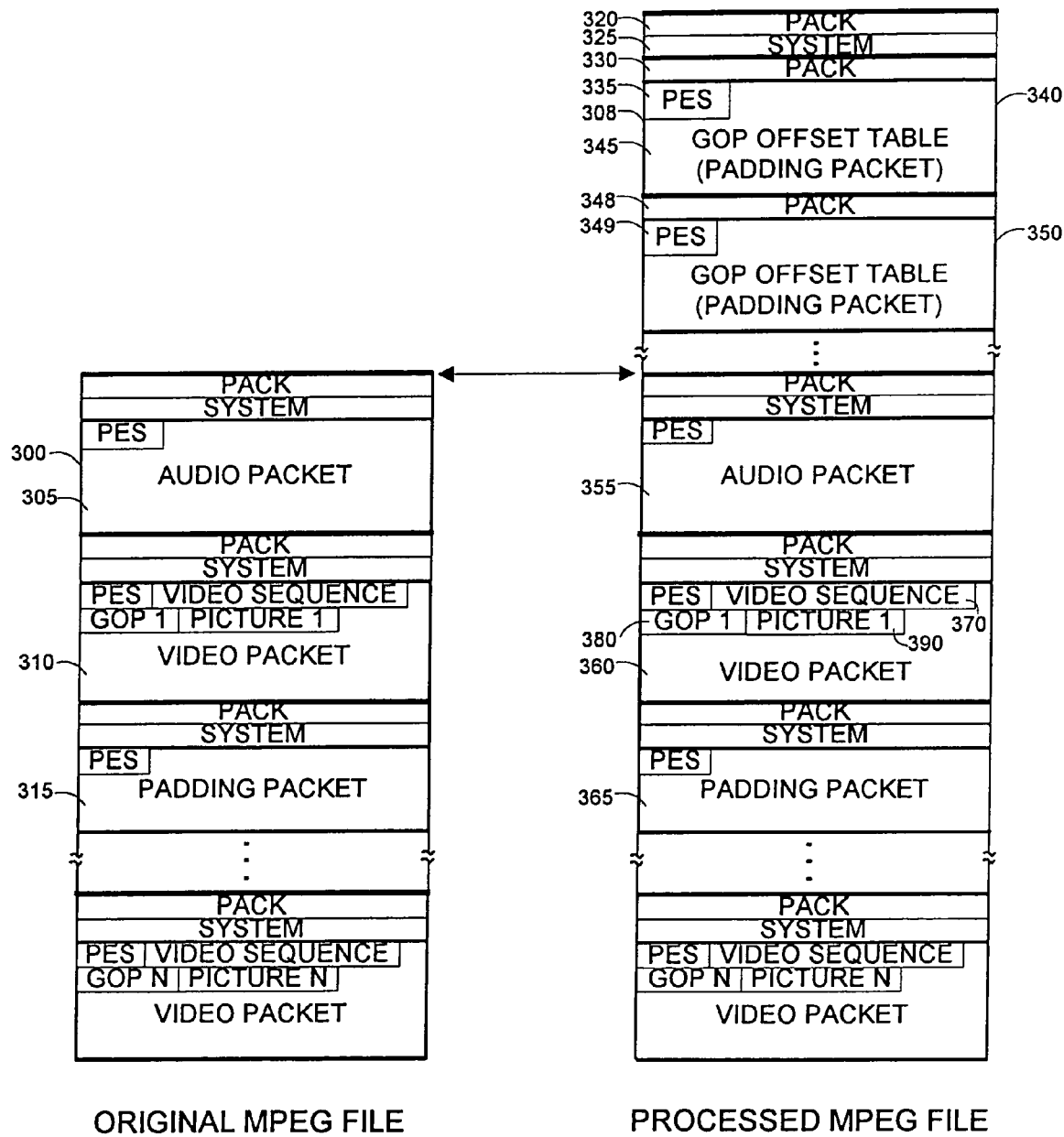
FIG. 3 illustrates the formatting of an MPEG file as originally encoded, and with a GOP offset table inserted according to the preferred embodiments of the present invention.

FIG. 3 illustrates the formatting of an MPEG file 300 as originally encoded, with audio packets 305, video packets 310, and padding packets 315, and an MPEG video file 308, reformatted according to the present invention, and having a GOP offset table 340 inserted according to the preferred embodiments of the present invention. Therefore, FIG. 3 provides a high level, non-scaled illustration of the MPEG file format before and after the GOP offset table 340 insertion. The GOP offset table 340 is affixed to the beginning of the MPEG file 308, as a series of GOP offset table padding packets 345, 350, so that the MPEG player can build in its memory (not shown) the entire GOP offset table 340 before the start of a video playout. The GOP offset table 340 is embedded within the padding packets 345, 350, which would be normally discarded by decoders. However, the GOP offset table padding packets 345, 350 contain an identifying offset table signature, to disambiguate them from other padding packets 365, and a padding packet sequence number, which will be reset to signal the last of the GOP offset table padding packets 345, 350, when a whole sequence of padding packets having the GOP offset table 340 is generated.

The padding packets 345, 350 also include a 32-bit checksum for bit error detection. If an error is detected, the MPEG player has the option of re-requesting a playout from the server, to have the MPEG video file 308 with the GOP offset table 340 retransmitted with minimal delay. Once the GOP offset table has been built in the MPEG player's memory, it is not rebuilt in the MPEG player even if the video is restarted from the beginning. Only the loading of another MPEG video file will cause the GOP offset table to be discarded and rebuilt.

As seen in FIG. 3, the GOP offset table 340 is encoded as a series of MPEG padding packets 345, 350 that are placed in front of the original MPEG file. To maintain MPEG compliance and facilitate proper decoding, the file 308 begins with a pack header 320 and a system header 325. A padding pack header 330, 348 is placed right before some or all GOP offset table padding packets 345, 350. A program elementary stream (PES) header 335, 349 is placed at the beginning of each GOP offset table padding packet 345, 350. A system clock reference (SCR) contained in each newly created file pack header (320, 330, 348) is adjusted backwards in time to maintain proper system timing. The rest of the processed MPEG video file 308 has the same audio packets 355 and video packets 360 as does the original MPEG video file 300.

In the preferred embodiments, each GOP offset table padding packet 345, 350 is sized at 2480 bytes to buffer up to 800 compressed offset table 3-byte entries, although it may have a different value. This represents a video duration of 6 minutes, 40 seconds for a GOP length of 15 pictures. Assuming a streaming bitrate of 3 Mbps, a single offset table padding packet 345, 350 extends the video download time by 6.6 milliseconds. The start of a 20-minute video will thus be delayed by less than 20 milliseconds.

Figure 4:
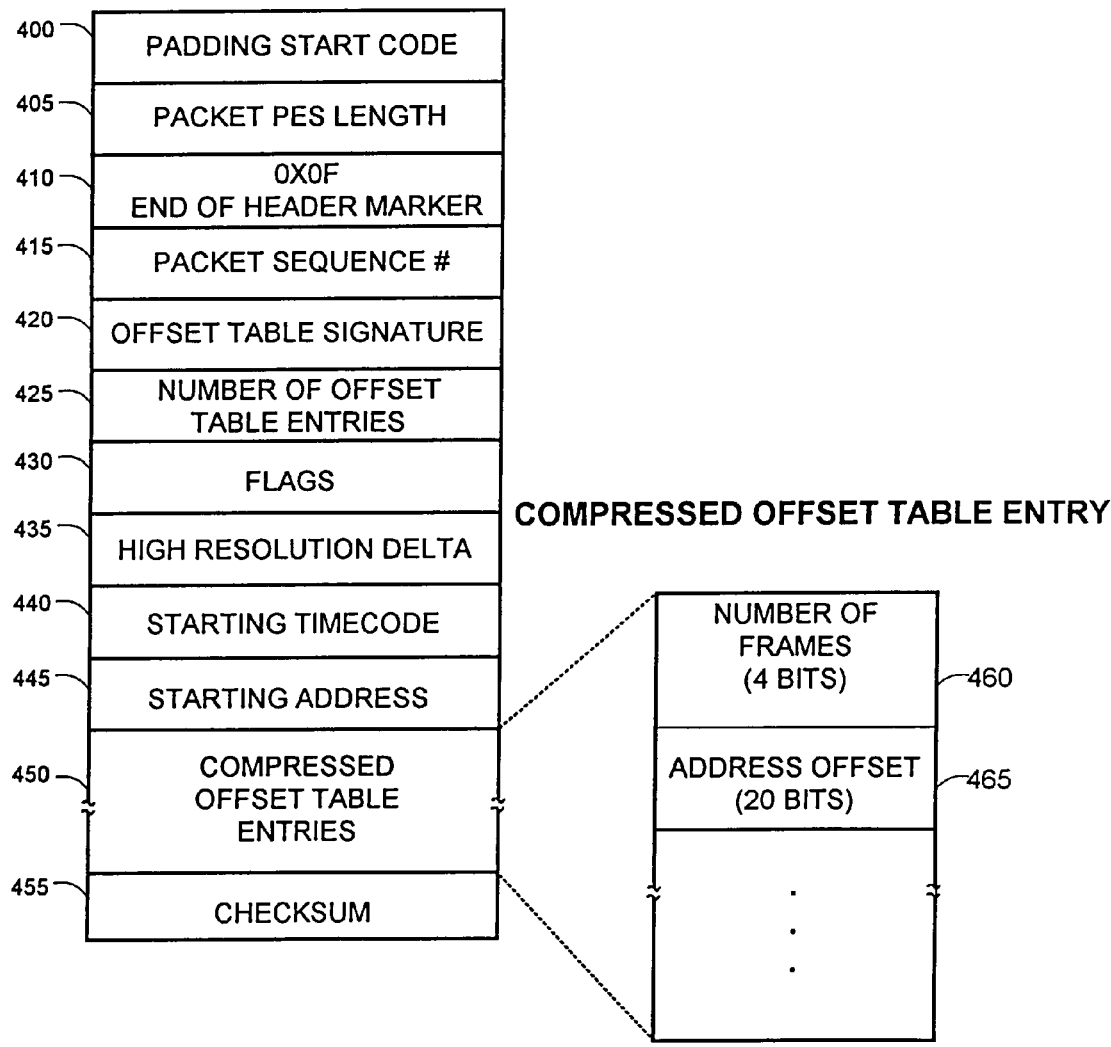
FIG. 4 illustrates a data structure of a compressed GOP offset table padding packet used to encode and transmit the GOP offset table information, according to the preferred embodiments of the present invention.

FIG. 4 illustrates a data structure of a compressed GOP offset table padding packet 345, 350 used to encode and transmit the GOP offset table information, according to the preferred embodiments of the present invention. Firstly, it has a conventional program elementary stream (PES) header 335, 349 consisting of a padding start code 400, a packet PES length 405 and an end-of-header marker 410. Following the standard PES header, the compressed GOP offset table padding packet of FIG. 4 of the present invention further includes: a padding packet sequence number 415, an offset table signature 420, a field containing the number of GOP offset table entries within this padding packet 425, a flags field 430, a high resolution delta field 435, a starting timecode field 440, and a starting GOP address field 445. The compressed GOP offset table padding packet further has a compressed GOP offset table 450 and a checksum field 455, as shown in FIG. 4.

The offset table signature 420 is a 4-byte unique signature that disambiguates the GOP offset table padding packets 345, 350 from the regular padding packets 365, which are normally discarded by the decoder. The padding packet sequence number 415 is provided to enable the decoder to detect missing GOP offset table padding packets 345, 350, and to signal the last GOP offset table padding packet, which is given a sequence number of zero. Similarly, the 32-bit checksum field 455 enables the decoder to detect padding packet bit errors. In case of an error, in the present invention the decoder issues a new request to the server to read the MPEG file, to have the erroneous GOP offset table padding packets retransmitted with a minimal delay. The present invention also allows for the erroneous packets to be discarded without affecting the remaining portion of the GOP offset table 340. Discarded packets, however, create a 'hole' in the GOP offset table 340, which results in an incorrect GOP offset, should any of the missing timecodes be queried.

FIG. 4 also has the compressed GOP offset table entries 450, which are compressed to 3 bytes to minimize the length of the GOP offset table padding packets 345, 350. Each such entry 450 represents one GOP header in the video packet and has two fields, as shown in FIG. 4: a field showing a number of the frames within a prior GOP 460 and a GOP address offset 20-bit field 465, having the address offset calculated by subtracting from the last pack header address the previous pack header address, found in the table entry 450 for the previous GOP. As each padding packet is decompressed by the MPEG decoder, the decoder is able to reconstruct the timecode and address offset of each GOP, by adding the number of frames 460 and address offset 465 of each GOP entry to the starting timecode 440 and starting GOP address 445, respectively. These totals for each GOP timecode and address offset are saved as temporary variables stored in memory.

MPEG File Analysis and Processing

Figure 5:
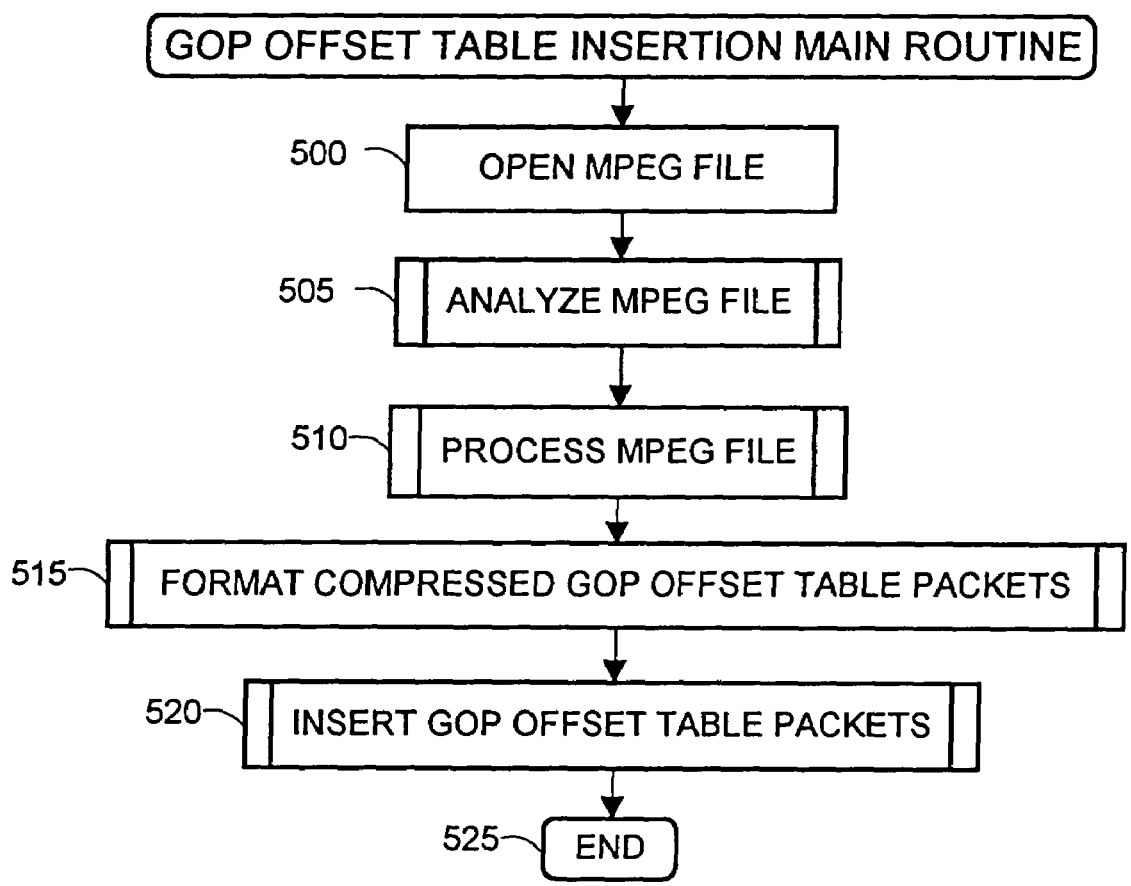
FIG. 5 is a logic flow diagram of the main software routine of the GOP offset table insertion application, according to the preferred embodiments of the present invention.
Figure 6:
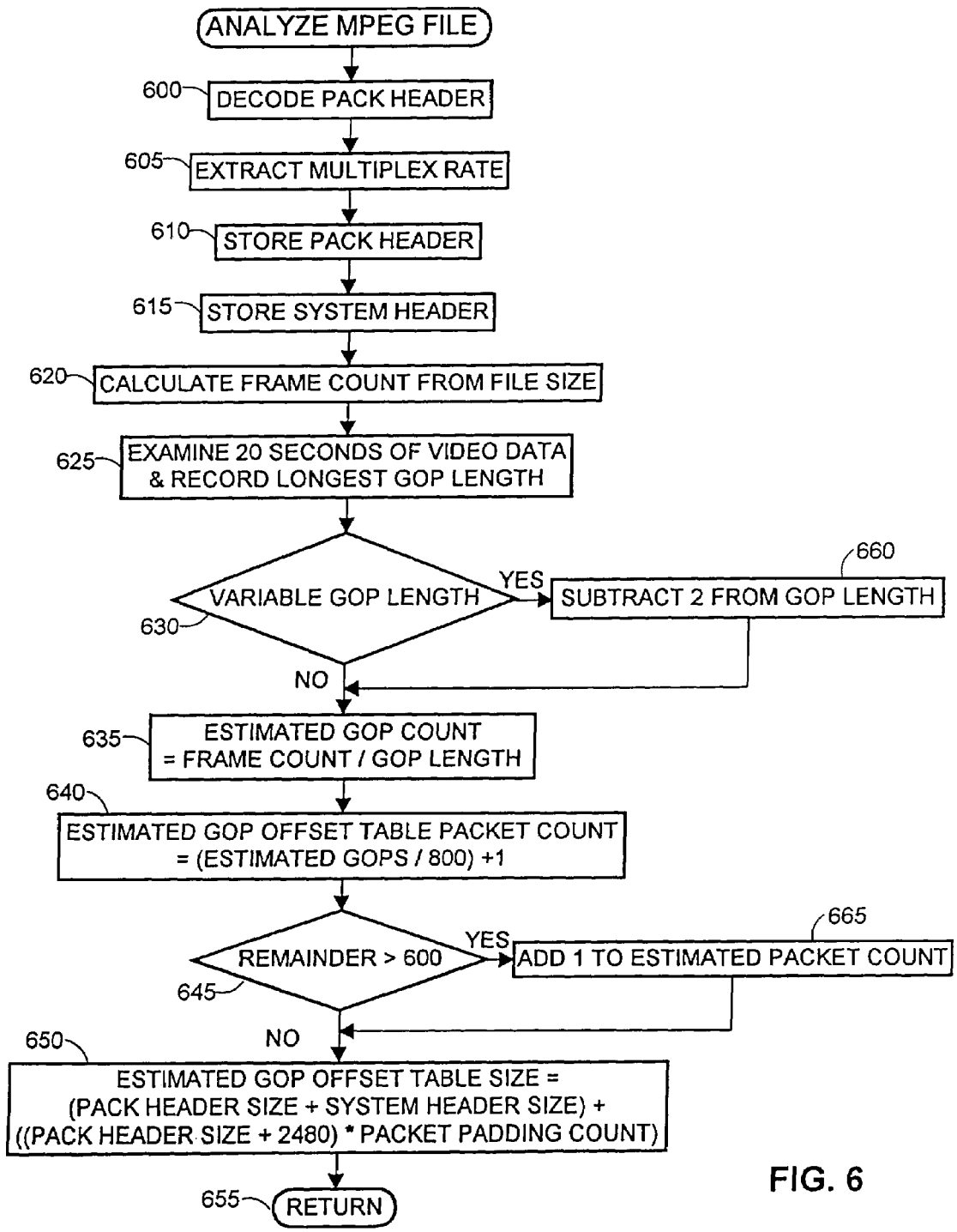
FIG. 6 is a logic flow diagram of a software routine for analyzing an MPEG video file to estimate the frame and GOP count, according to the preferred embodiments of the present invention.

FIG. 5 is a logic flow diagram of the main software routine of the GOP offset table insertion application, according to the preferred embodiments of the present invention. After opening an MPEG video file in step 500, in step 505 the application calls the Analyze MPEG File routine of FIG. 6, to analyze the first 10 seconds of the original video file, in order to estimate the number of frames and GOP headers, and to save a copy of the first pack header and system header of the original MPEG video file. In FIG. 6 the first found pack header is decoded in step 600 and the stream multiplex bitrate is extracted in step 605. In step 610 the pack header, and in step 615 the system header, are both copied and stored in memory for later use. Using the multiplex bitrate obtained in step 605, the number of video frames in the video file (frame count) is estimated in step 620 by dividing the file size by the bitrate. In step 625 the first 20 seconds of the video are analyzed to determine the maximum GOP length, and whether the GOP length is variable or fixed. If in step 630 it is found that the GOP length is variable, the maximum GOP length is reduced in step 660 by 2 frames, before estimating in step 635 the number of GOPs in the file. This number is calculated by dividing the number of video frames (frame count) by the GOP length. Once the number of GOPs has been estimated, it is divided in step 640 by 800 to calculate the number of padding packets needed to buffer the GOP offset table entries. If the remainder is 600 or greater, the count is incremented in step 665 by 1, to provide a safety margin. The routine ends by calculating the estimated total size of the GOP offset table in step 650, and returning to the main application routine in step 655. The estimated total size of the GOP offset table is calculated by adding each GOP offset table padding packet size (2480) to the pack header size, multiplying this total with the padding packet count and adding to it the pack header size and system header size. The pack header 320 and system header 325 are inserted at the beginning of the MPEG file to allow the MPEG decoder to properly identify the file as an MPEG program stream. Subsequently, the pack header 330, 348 is inserted before the beginning of each GOP offset table padding packet 340, 350. Each PES header 335, 349 is considered a part of its respective padding packet.

In order to maximize application performance, the present invention reads the MPEG video file only once. In order to limit the file reading to a single read, the number of GOPs must be estimated, in order to allocate sufficient storage in the reprocessed MPEG file for the GOP offset table padding packets. The two frames subtracted from the maximum GOP length before dividing it into the number of frames is an empirically derived value that provides a reasonable safety margin against overrunning the allocated GOP offset table storage. If the actual number of GOPs greatly exceeds the estimated value, the GOTIA aborts the current processing of the MPEG video file and restarts with a larger GOP count estimate.

Figure 7A:
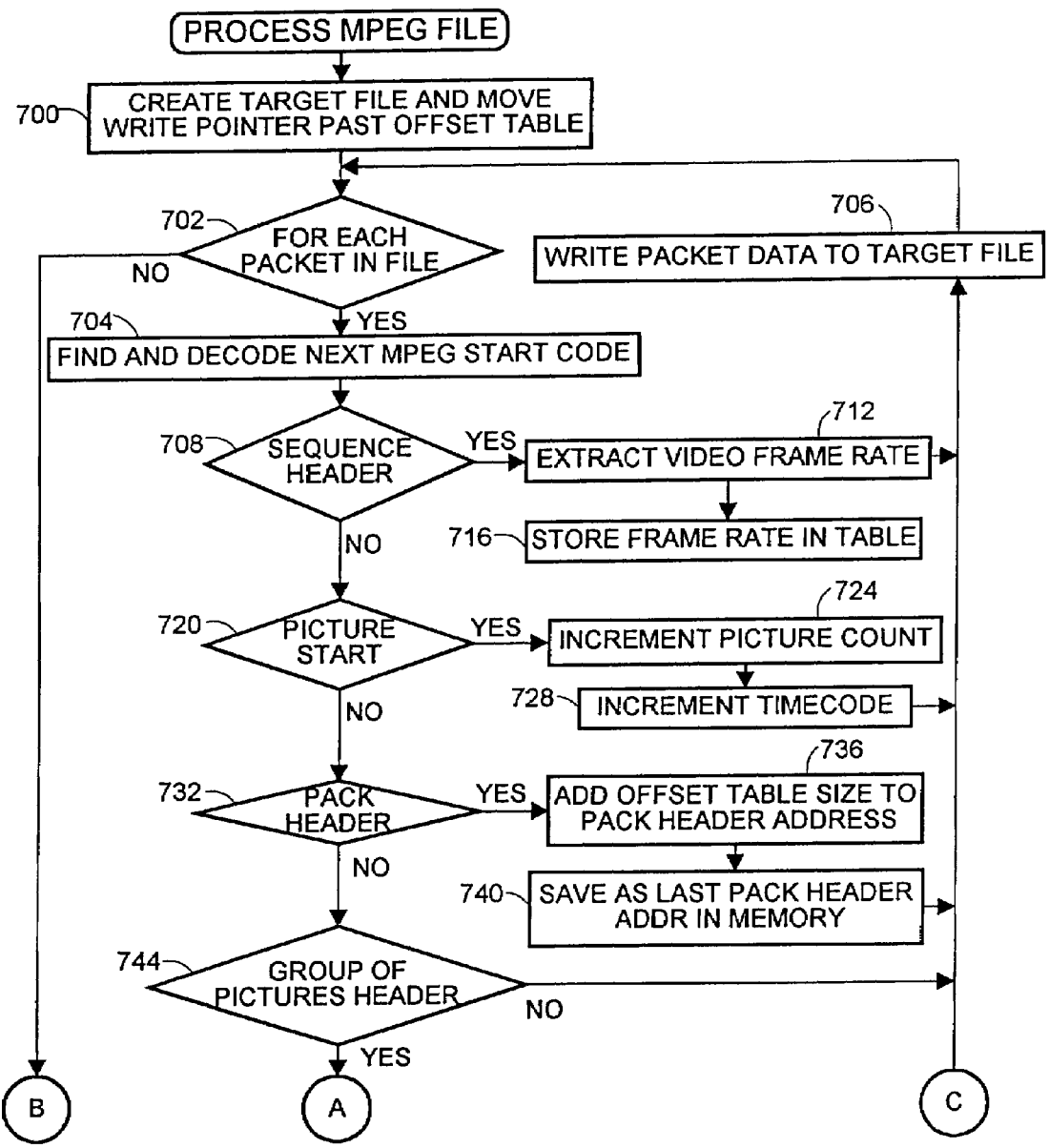
FIGS. 7A and 7B illustrate the logic flow diagram of a software routine for processing an MPEG file to extract the address offset and size of each GOP, according to the preferred embodiments of the present invention.
Figure 7B:
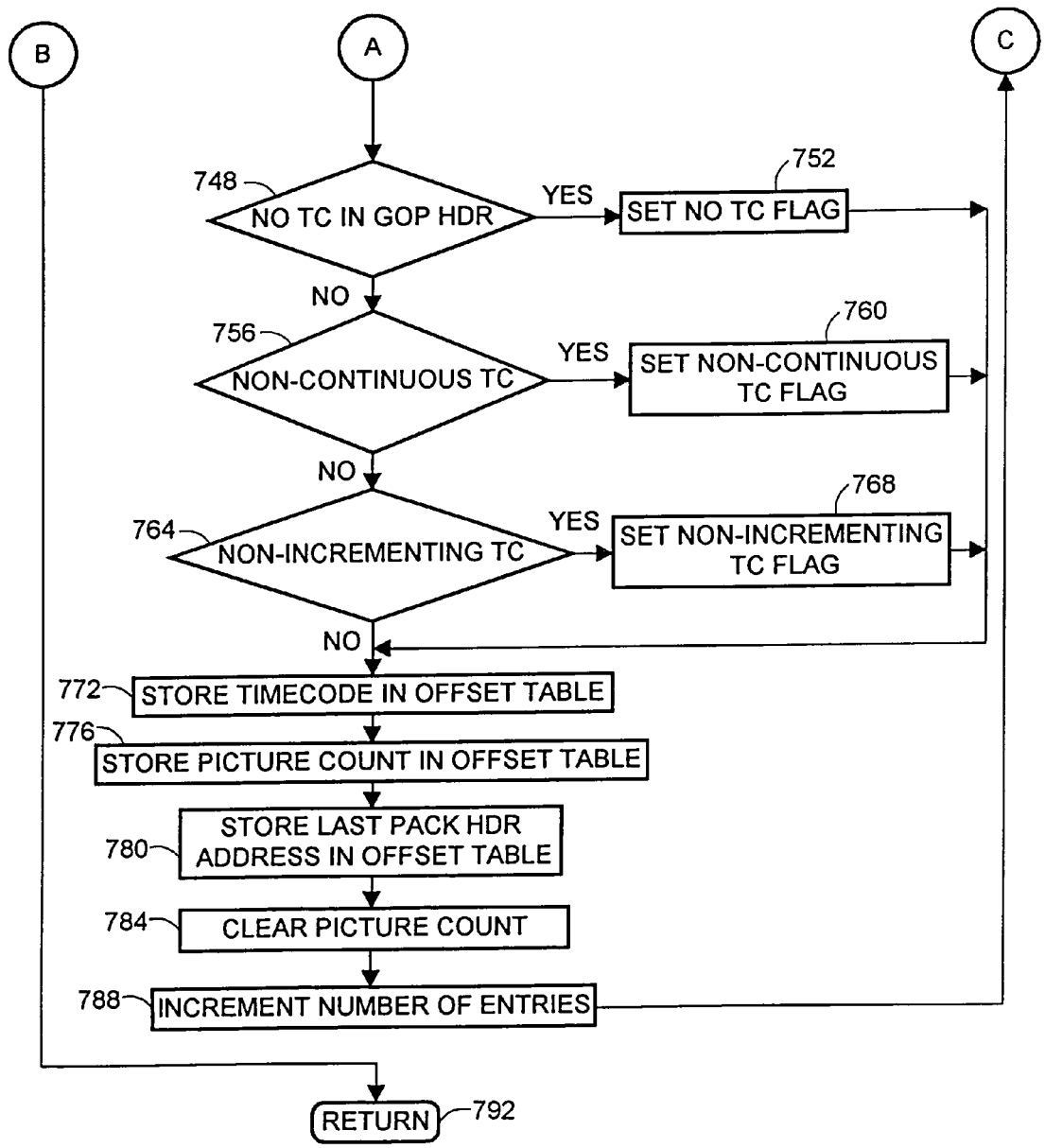
Figure 8:
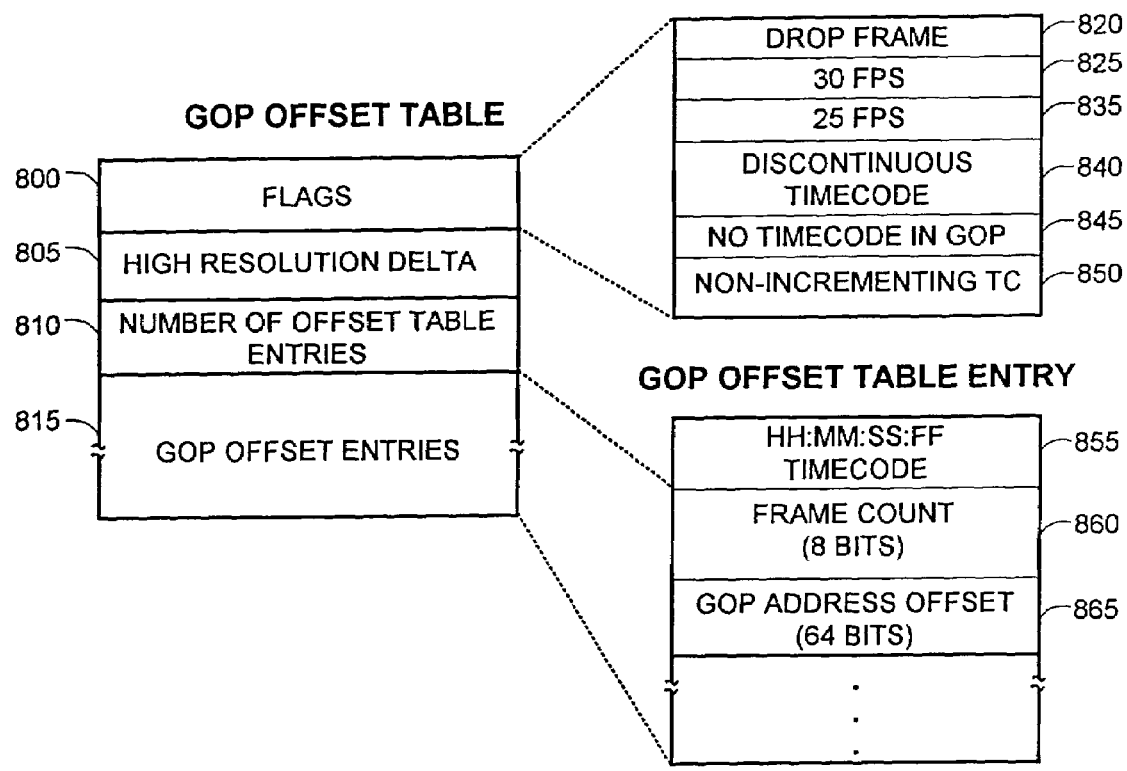
FIG. 8 is an illustration of a GOP offset table data structure, according to the preferred embodiments of the present invention.

Referring now to FIG. 5, after analyzing the MPEG file, the Process MPEG File routine of FIGS. 7A and 7B is called in step 510 to extract the address offset and size of each GOP and compile an array of GOP address offset entries. FIG. 8 illustrates an uncompressed version of the GOP offset table. The GOTIA builds this table while parsing the MPEG file, and stores it in memory as a temporary data structure. After the MPEG file has been completely parsed, this table is used to build a compressed GOP offset table of FIG. 4, which is stored in padding packets. When the MPEG decoder extracts the padding packets from the MPEG stream, it decompresses the GOP offset table, thus recreating the original version of the GOP offset table, and stores it in the memory. The structure of FIG. 8 holds a set of flags 800 that are passed on to the MPEG player via the field 430 of the compressed GOP offset table padding packet of FIG. 4, in order to properly reconstruct the GOP offset table.

Referencing FIGS. 7A and 7B, the routine starts in step 700 by creating a file for storing the processed, modified MPEG file and setting the write pointer past the area allocated for the GOP offset table packets. The logic then enters a loop in step 702 to processes each packet of the MPEG file. In addition to audio and video packets, there are miscellaneous system and padding packets that are detected and written to the file in step 706, without further processing. In step 704 the file is sequentially decoded to locate and process each MPEG video packet start code. If in step 708 it is found that the start code is a video sequence header 370, the video frame rate is extracted in step 712 and is stored in step 716, setting either a 30-frames per second flag 825, or a 25-frames per second flag 835, in an uncompressed GOP offset table of FIG. 8. Additionally, if the video sequence packet indicates drop-mode frame counting, a drop frame flag 820 is set accordingly.

After storing the frame rate in step 716, the packet data are written out to the processed MPEG file in step 706 and the loop iterates. When in step 720 a picture start header is found, in step 724 the picture count is incremented, and in step 728 the SMPTE timecode frame count is incremented. Both values are saved as temporary variables in memory. Then, the MPEG packet data are written to the processed MPEG file in step 706 and the loop continues. When a pack header is found in step 732, the estimated offset table size, obtained in step 650 of FIG. 6, is added to the pack header address in step 736, and the result is saved in step 740 as a last pack header address, in a temporary variable in memory. When the next GOP header is eventually found, the last pack header address will be stored, in step 780, in the associated GOP address offset field 865 field of the temporary, uncompressed GOP offset table. The reason the last pack header address is recorded instead of the actual GOP header address is to allow the MPEG decoder to resynchronize its clock prior to decoding the GOP offset table. Next, the packet data are written to the processed MPEG file in step 706 and the loop continues.

If the current start code found in step 744 is not a GOP header, the packet data are written to the processed MPEG file in step 706 and the loop continues. Otherwise, a series of tests is made on the timecode contained in the GOP header. If no timecode is found in step 748, the 'No TC' flag 845 of FIG. 8 is set in step 752. If a timecode is present, it is tested for continuity in step 756 and for incrementing in step 764. The 'Discontinuous TC' 840 and/or the 'Non-incrementing TC' 850 flag of FIG. 8 is set in steps 760, 768, respectively, if either test fails. In all cases, the logic proceeds to step 772, where the timecode, extracted from the GOP header, is stored in the field 855, and, in step 776, the count of frames contained in the previous GOP is restored from the variable, saved in memory in step 724, into the field 860 of the temporary, uncompressed GOP offset table of FIG. 8. The GOP offset table fields entry is completed in step 780 by storing the last pack header address, maintained as a temporary variable, in the field 865 of FIG. 8. Next, the picture count variable is zeroed in step 784, the number of GOP offset entries 810 is incremented in step 788, and the packet data are written to the processed MPEG file in step 706. The loop processes each packet in the MPEG file and exits when the end of the original MPEG file is reached in step 702, at which time the subroutine returns control in step 792 to the main application routine of FIG. 5.

GOP Offset Table Packet Creation

Figure 9A:
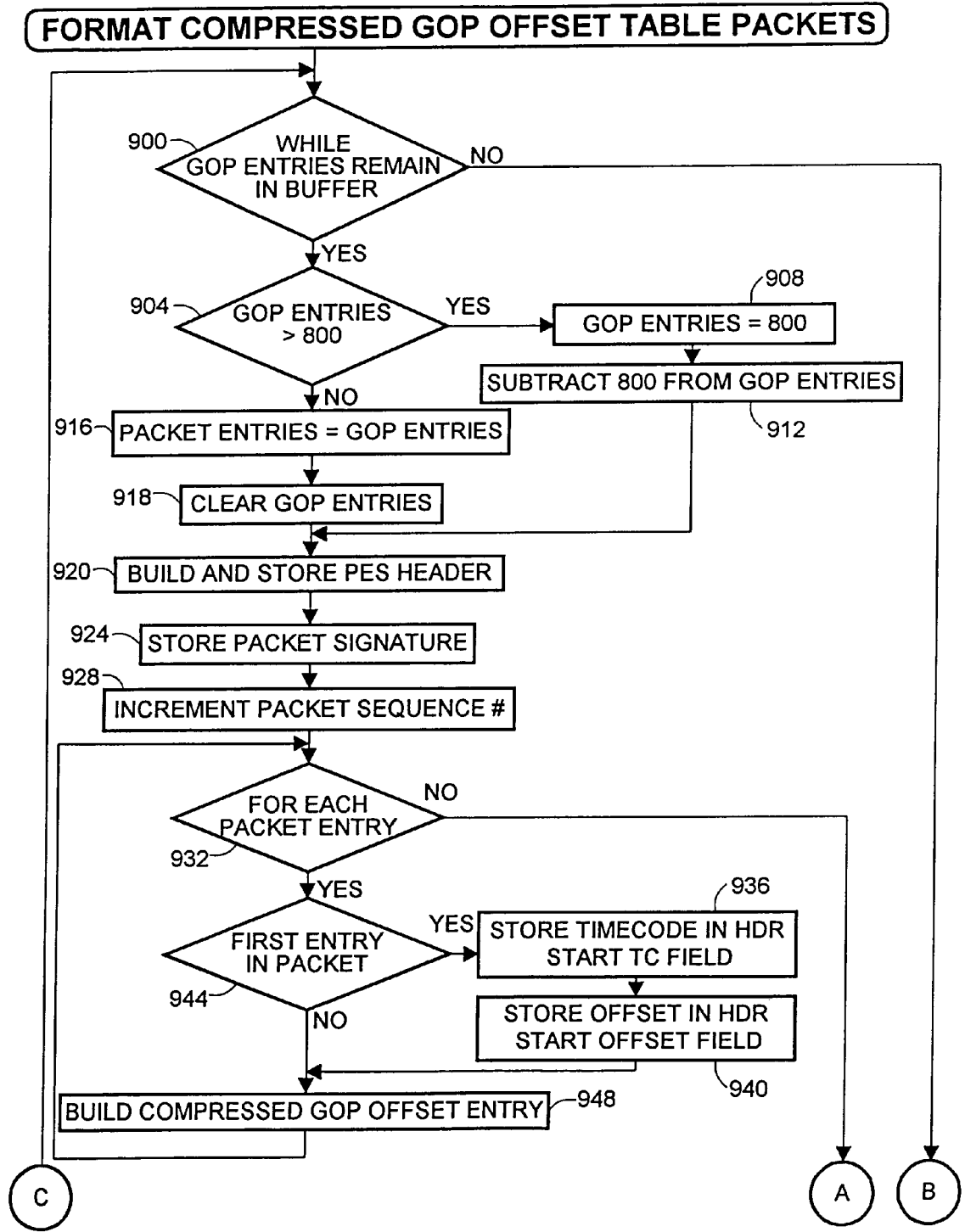
FIGS. 9A and 9B illustrate the logic flow of a software routine for formatting compresses MPEG packets containing the GOP offset table information, according to the preferred embodiments of the present invention.
Figure 9B:
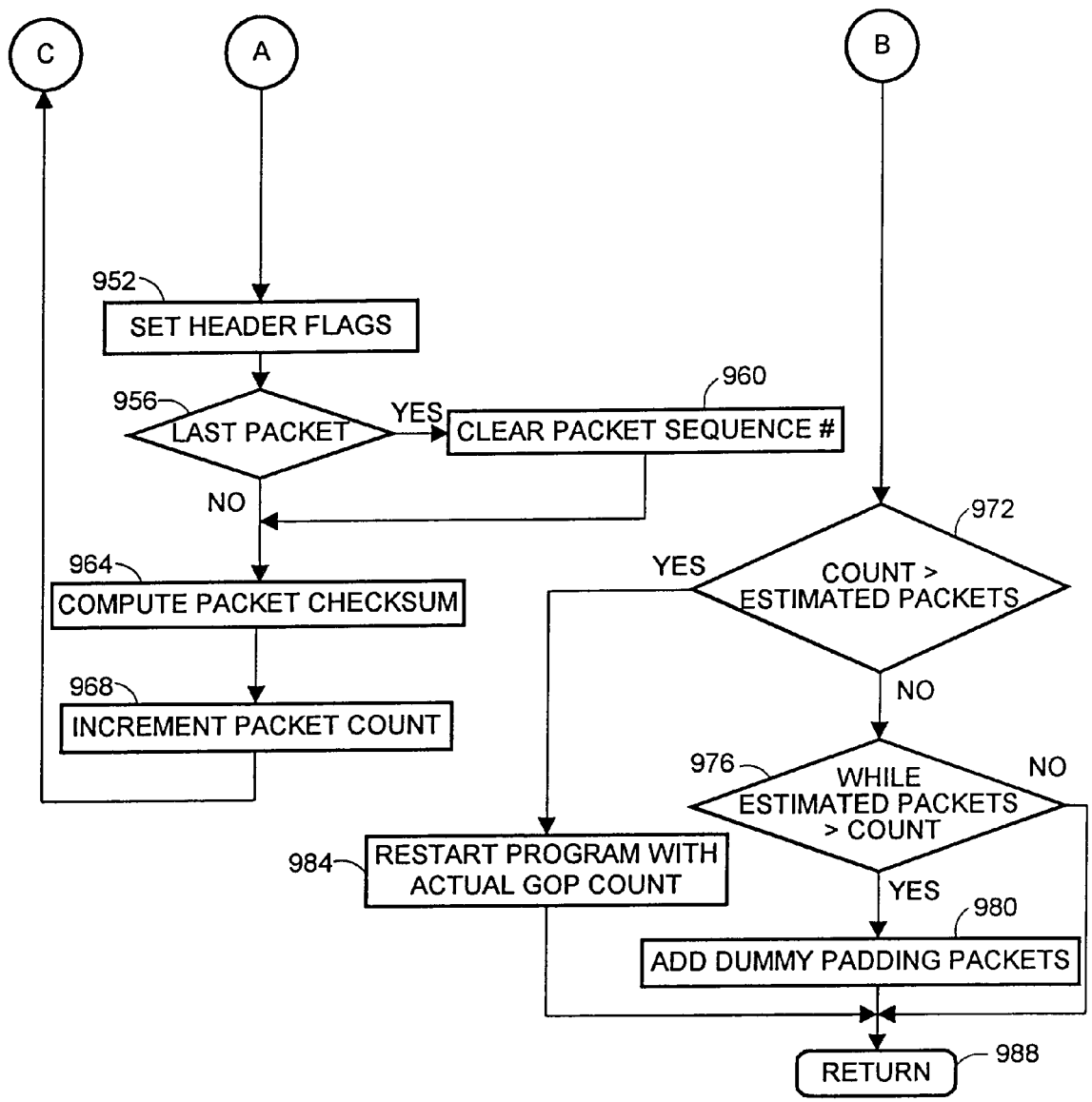

After the uncompressed GOP offset table of FIG. 8 has been built, the main routine of FIG. 5 in step 515 calls a subroutine of FIGS. 9A and 9B to format the compressed GOP offset table padding packets. As shown in FIGS. 9A and 9B, the subroutine enters a loop in step 900 to compress and packetize all recorded GOP offset table entries of FIG. 8 according to the compressed offset table packet format depicted in FIG. 4. If in step 904 it is found that the number of remaining GOP offset table entries is greater than 800, the number of GOP offset table entries 425 is set to 800 in step 908, and the number of remaining entries is reduced by 800 in step 912. Otherwise, the number of entries 425 is set to the number of remaining GOP offset table entries in step 916, and the number of remaining GOP entries is cleared in step 918. The logic continues to build the PES header 400, 405, 410 in step 920, insert the signature 420 in step 924, and increment the packet sequence number 415 in step 928. A secondary loop is then entered in step 932 to populate the padding packet with compressed GOP offset entries. When processing the first entry in step 944, the GOP timecode 855 is stored into the padding packet of FIG. 4 in field 440 as the starting timecode, in step 936. All GOP offset table entries in this padding packet will have their timecodes encoded in the number of frames 460, as an offset from the starting timecode 440. In step 940, the first GOP address offset 865 is stored in field 445 as the starting address offset. All other compressed offset table entries 450 in this padding packet will have their GOP address offset 465 calculated as an offset, by subtracting the previous GOP address offset 865, found in the table entry 865 for the previous GOP, from this GOP address offset 865.

Each of the GOP offset table entries 450 is then built by compression, performed in step 948, into a 3-byte GOP offset table entry. When all entries have been processed, the loop exits on the no condition in step 932, and the header flags 800, set in the Process MPEG File routine of FIGS. 7A and 7B, are stored in step 952 in the flags field 430 of FIG. 4. If the last packet is being formatted in step 956, the padding packet sequence number 415 is cleared in step 960. The building of the packet is completed by computing and storing the packet checksum 455 in step 964, and, in step 968, incrementing the padding packet count, saved as a temporary variable stored in memory.

The primary loop starting with 900 exits on the no condition when all of the GOP offset table entries have been packetized. Before writing the padding packets to the processed MPEG file, a check is made in step 972 to determine if the actual number of GOP offset table padding packets exceeds the amount of storage reserved for them. If yes, the GOTIA is restarted with the actual number of GOP headers in step 984. If the number of GOPs packets is less than estimated, the logic falls into a loop in step 976, that adds dummy padding packets in step 980 to pad out the GOP offset table. If the number of packets equals the estimated number, the no condition of step 976, the subroutine returns to the main routine of FIG. 5 in step 988.

GOP Offset Table Insertion

Figure 10:
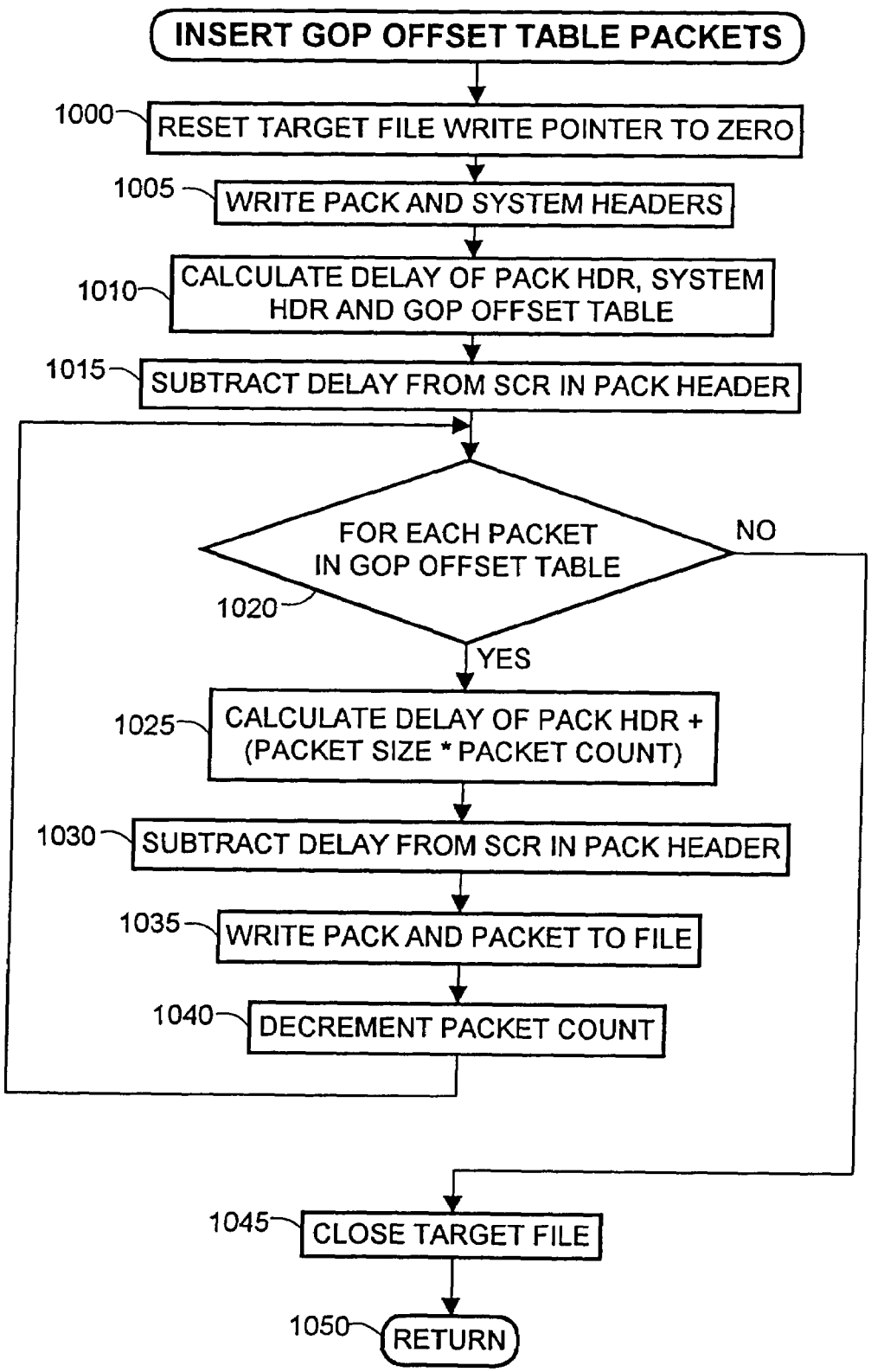
FIG. 10 illustrates the logic flow of a software routine for inserting GOP offset packets into an MPEG file without perturbation of the existing compressed MPEG data, according to the preferred embodiments of the present invention.

Returning again to FIG. 5, in step 520 the Insert GOP Offset Table Padding Packets subroutine of FIG. 10 is called to write the padding packets with the GOP Offset Table out to the processed MPEG file. Referring now to FIG. 10, the write pointer of the processed MPEG file is reset to zero in step 1000 and the pack and system headers, saved in steps 610 and 615 of FIG. 6, are written to the file in step 1005. In step 1010, the delay of the pack header, system header, and GOP offset table is calculated by summing the size of the pack and system headers and all padding packets, and dividing the result by the stream multiplex rate. This result is converted into an equivalent number of 90 kHz clock cycles, and in step 1015 subtracted from the SCR contained in the pack header. Looping through each padding packet starts in step 1020. The delay incurred for the current and subsequent padding packets is calculated in step 1025 and subtracted from the SCR of the preceding pack header in step 1030. The padding packet size in step 1025 includes the PES header. For MPEG streams with a low starting SCR value, the subtraction will result in an underflow of the 33-bit SCR register, requiring an added operation of modulo addition. Both the pack header and the padding packet are then written to the file in step 1035, and the packet count is decremented in step 1040. When no padding packets remain, the loop exits on the 'no' condition in step 1020, the processed MPEG file is closed in step 1045, and the subroutine returns in step 1050 to the caller of FIG. 5. The main routine of FIG. 5 then ends in step 525, stopping the application.

MPEG Decoder/Player

Figure 11A:
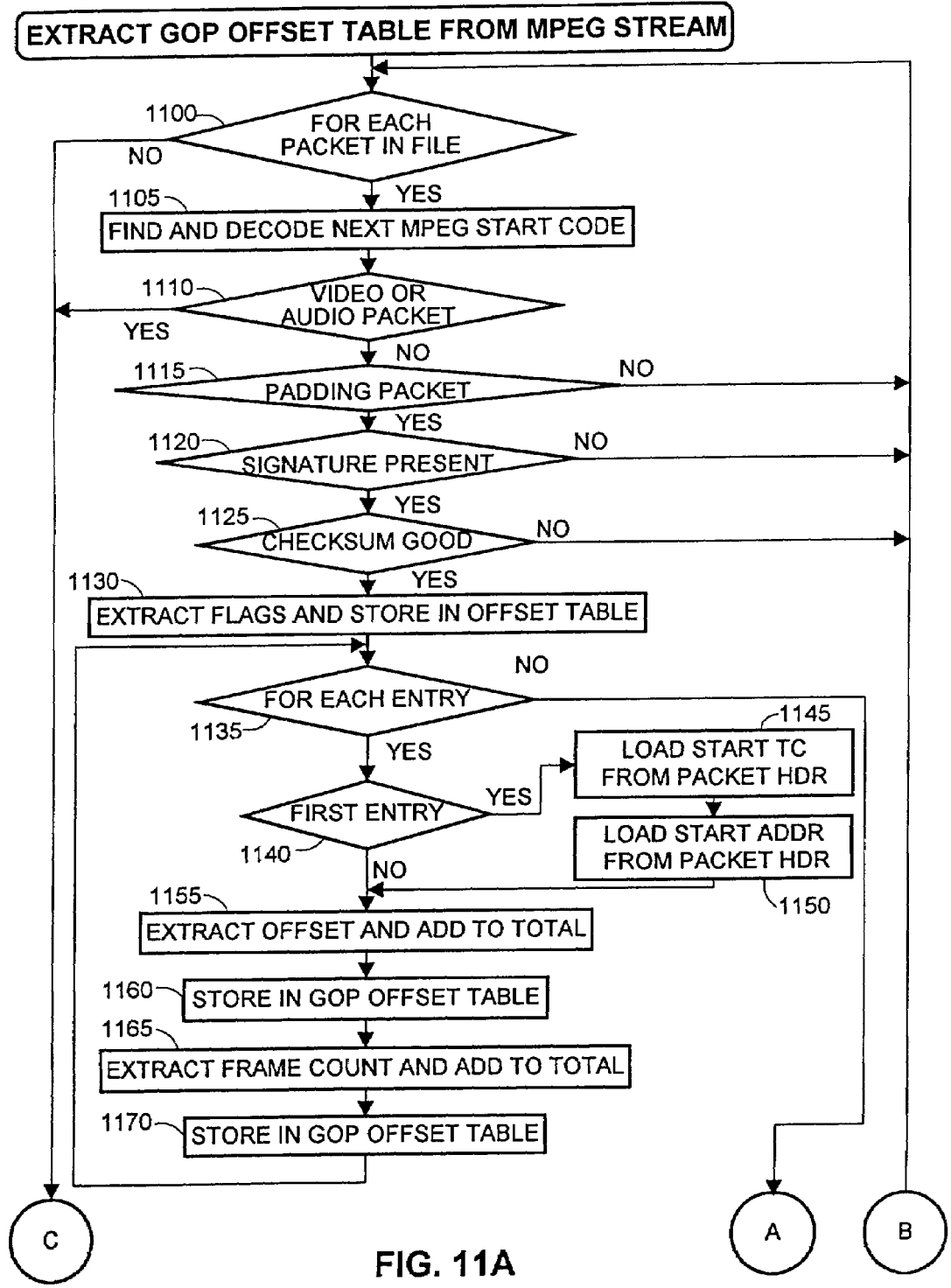
FIGS. 11A and 11B illustrate a logic flow of a software routine used by an MPEG player for extracting the GOP offset table from an incoming MPEG stream, according to the preferred embodiments of the present invention.
Figure 11B:
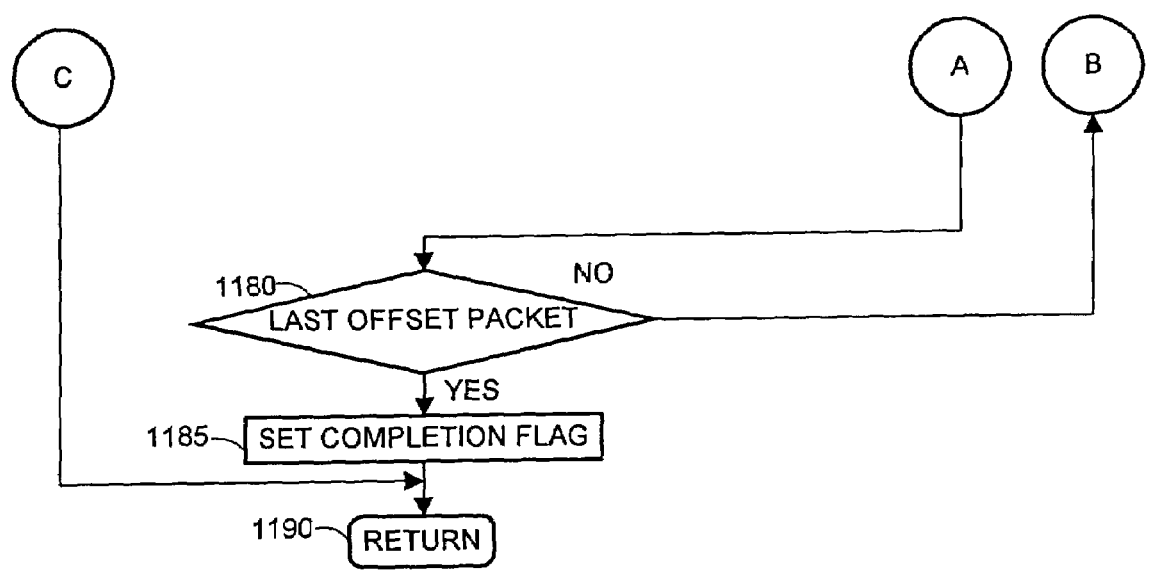

FIGS. 11A and 11B illustrate a logic flow of a software routine used by an MPEG player for extracting the GOP offset table from an incoming MPEG stream, according to the preferred embodiments of the present invention. The GOP offset table is extracted by the MPEG decoder/player as the file is received, and then decompressed and stored into a global GOP offset table that can be referenced by any application via API invocation. For example, it can be referenced by the EDL builder and the cataloger applications included in the video library applications. The decompressed GOP offset table data structure is identical to the table illustrated in FIG. 8.

According to FIGS. 11A and 11B, the routine immediately falls into a loop in step 1100 to process each packet as the file is received. Each start code is decoded in step 1105, and examined in step 1110 to see if the packet is a video or audio packet. If yes, the subroutine returns in step 1190 because the presence of audio or video packet indicates that there are no more GOP offset table padding packets to recover. If the packet is not a padding packet, according to step 1115, the loop iterates to step 1100 via the no condition. Otherwise, the packet is a padding packet and the packet is tested for a signature in step 1120 and in step 1125 for a correct checksum. If either test fails, the loop iterates to step 1100 to process the next packet. If the padding packet satisfies both conditions, the flags are extracted and stored in step 1130, and the logic falls into a secondary loop starting with step 1135, to process each offset table entry. On the first iteration in step 1140, from the padding packet header the starting timecode is loaded in step 1145, and the starting address offset for all GOP headers encoded in the current padding packet is loaded in step 1150. Both are used to resolve the timecode and address of each compressed table entry. In steps 1155 and 1160, the 20-bit address offset is read from the packet and added to the starting address to create a 64-bit GOP address offset in the table. The timecode is likewise processed in steps 1165 and 1170, adding the number of frames to the starting timecode loaded in step 1145. The timecode accumulates for each GOP header entry in the padding packet. When the last entry has been decompressed, the secondary loop exits on the no condition in step 1135, and a test is made in step 1180 to determine if the offset padding packet is the last. If yes, the completion flag is set in step 1185, and the routine returns in step 1190. Otherwise, the primary loop again iterates to step 1100 to handle the remaining offset table padding packets.

Video Producer's MPEG Player/Metadata Viewer

Figure 12:
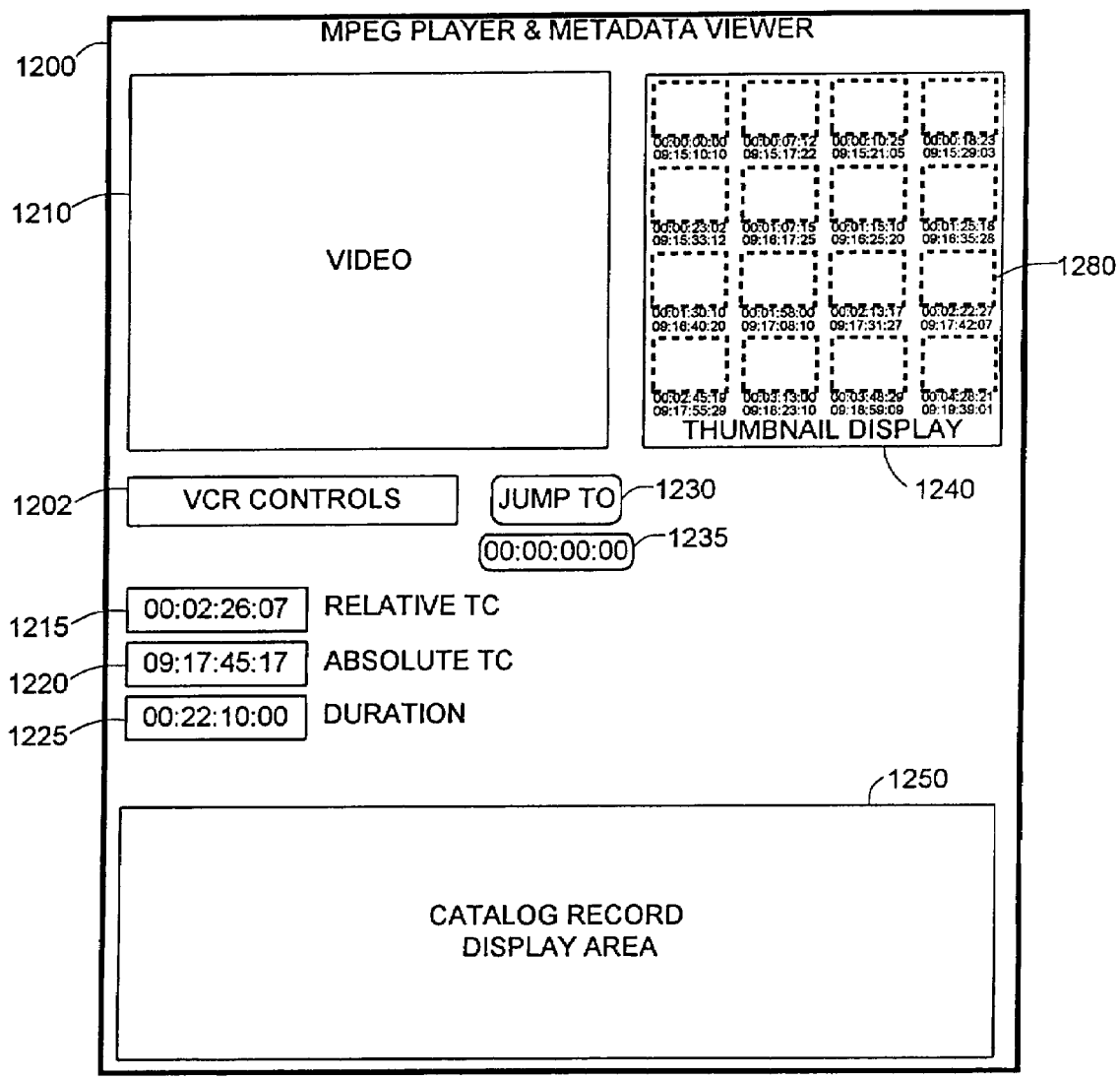
FIG. 12 is an illustration of the graphical user interface (GUI) of an MPEG player and cataloger used for video cataloging to display streaming video and metadata, according to the preferred embodiments of the present invention.

FIG. 12 is an illustration of the graphical user interface (GUI) of an MPEG player and metadata viewer 1200, used by a video production specialist for video cataloging to display streaming video and metadata, according to the preferred embodiments of the present invention. In the layout of the video producer's MPEG player and metadata viewer of FIG. 12, VCR controls 1202 are provided, and a video display area 1210 reflects a paused video with a current position of 00:02:26:07. The lower portion of the window provides a display area for the catalog record 1250, for the catalog record requested from video library application.

A relative timecode 1215, absolute timecode 1220, and duration 1225 of the current frame are displayed. There is also a jump-to button 1230, to select a timecode shown on an indicator 1235 for a desired video clip to be jumped to. In a storyboard thumbnail display window 1240 there are twelve thumbnails. The third thumbnail in the third row 1280, highlighted from a double click, commanded a play from relative timecode 1215 of 00:02:26:07 offset from the absolute timecode 1220 of 09:17:45:17.

When an end user issues a request to view an MPEG file, the MPEG player sends a request to the video server to open the file and begin streaming from offset 0. This results in the video server streaming the padding packets containing the GOP offset table, allowing the MPEG decoder to build the GOP offset table. Once the last GOP offset table padding packet has been received and the GOP offset table, as defined in FIG. 8, has been completely built, the player becomes capable of randomly accessing any frame in the MPEG video file.

When an end user issues a play-from-offset request, via the jump to button 1230 selecting the offset shown on the indicator 1235, the player immediately sends a play-from-offset request to the video server to commence streaming from the first GOP header prior to the user-requested timecode. Firstly, the player has to convert the requested timecode to a GOP offset address, using a binary search to search the array of GOP offset table entries 815. The GOP offset table entry associated with the requested timecode is located by comparing the requested timecode with each GOP timecode 855 from the table. When the associated GOP offset table entry is found, the GOP address offset 865 is read and passed to the video server. If the GOP timecode 855 is not the requested timecode, the player subtracts the GOP timecode 855 from the requested timecode to calculate the number of video frames to skip in order to cue on the requested frame. The player suppresses video display while skipping frames, until reaching the requested frame. If the player is decoding a locally stored MPEG file, the player makes the corresponding file read pointer update itself If, before the video has started streaming, an end user issues a play-from-offset request, via the jump to button 1230 selecting the offset shown on the indicator 1235, the player first issues a play-from-offset 0 request to the video server. This results in the video server streaming the padding packets containing the GOP offset table allowing the MPEG decoder to build the GOP offset table. Once the table is built, the player immediately reissues the play-from-offset command to the video server, to commence streaming from the first GOP header prior to the requested timecode.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatic insertion of a compressed GOP offset table within a previously encoded MPEG video file, for frame accurate random access of each individual video frame by an MPEG player/decoder in play-from-offset mode, comprising the following steps:
   (a) creating a compressed GOP offset table having an entry for each GOP header of every video packet of the MPEG video file and a padding packet sequence number, for obtaining accurate GOP header SMPTE timecode and address offsets; and
   (b) modifying the MPEG video file by inserting the compressed GOP offset table into the MPEG video file as at least one padding packet, while maintaining the MPEG video file's original frame presentation,
   thereby preserving the MPEG compliance and compressed audio/video data of the MPEG video file.

2. The method according to claim 1, further comprising a step for estimating a number of padding packets needed for the GOP offset table, thereby limiting the MPEG video file reading to a single read.

3. The method according to claim 1, wherein at least one compressed GOP offset table padding packet being preceded by a pack header having a system clock reference (SCR), and further comprising: a standard PES header, an offset table signature, a starting timecode field, and a starting GOP address field.

4. The method according to claim 3, wherein each said GOP header entry further comprises: a field for number of frames within a prior GOP, and a field for a GOP address offset having an offset address of the pack header corresponding to the GOP header, for re-synchronizing an MPEG player/decoder clock prior to decoding of the GOP offset table, and for reconstructing the timecode and address offset of each GOP header during decompression and decoding by the MPEG player/decoder, by adding the number of frames and address offset of each GOP header entry to the starting timecode and starting GOP address, respectively, and for allowing random access of each individual video frame in play-from-offset mode.

5. The method according to claim 3, further comprising a step for adjusting the SCR backwards in time, after the GOP offset table insertion, for maintaining proper system timing.

6. A system for automatic insertion of a compressed GOP offset table within a previously encoded MPEG video file, for frame accurate random access of each individual video frame by an MPEG player/decoder in play-from-offset mode, comprising:
   a computer coupled to an electronic storage device for storing the MPEG video file;
   programming means, performed by the computer, for creating a compressed GOP offset table having an entry for each GOP header of every video packet of the MPEG video file and a padding packet sequence number, obtaining accurate GOP header SMPTE timecode and address offsets; and
   programming means, performed by the computer, for modifying the MPEG video file by inserting the compressed GOP offset table into the MPEG video file as at least one padding packet, while maintaining the MPEG video file's original frame presentation,
   thereby preserving the MPEG compliance and compressed audio/video data of the MPEG video file.

7. The system according to claim 6, further comprising a means for estimating a number of padding packets needed for the GOP offset table, thereby limiting the MPEG video file reading to a single read.

8. The system according to claim 6, wherein at least one compressed GOP offset table padding packet being preceded by a pack header having a system clock reference (SCR), and further comprising: a standard PES header, an offset table signature, a starting timecode field, and a starting GOP address field.

9. The system according to claim 8, wherein each said GOP header entry further comprises: a field for number of frames within a prior GOP, and a field for a GOP address offset having an offset address of the pack header corresponding to the GOP header, for re-synchronizing an MPEG player/decoder clock prior to decoding of the GOP offset table, and for reconstructing the timecode and address offset of each GOP header during decompression and decoding by the MPEG player/decoder, by adding the number of frames and address offset of each GOP header entry to the starting timecode and starting GOP address, respectively, and for allowing random access of each individual video frame in play-from-offset mode.

10. The system according to claim 8, further comprising a means for adjusting the SCR backwards in time, after the GOP offset table insertion, for maintaining proper system timing.

11. A computer readable medium readable by a computer tangibly embodying a computer program of instructions executable by the computer to perform method steps for automatic insertion of a compressed GOP offset table within a previously encoded MPEG video file, for frame accurate random access of each individual video frame by an MPEG player/decoder in play-from-offset mode, the MPEG video file stored in an electronic storage device coupled to the computer, the method comprising the following steps:
- (a) creating a compressed GOP offset table having an entry for each GOP header of every video packet of the MPEG video file and a padding packet sequence number, for obtaining accurate GOP header SMPTE timecode and address offsets; and
- (b) modifying the MPEG video file by inserting the compressed GOP offset table into the MPEG video file as at least one padding packet, while maintaining the MPEG video file's original frame presentation, thereby preserving the MPEG compliance and compressed audio/video data of the MPEG video file.

12. The method according to claim 11, further comprising a step for estimating a number of padding packets needed for the GOP offset table, thereby limiting the MPEG video file reading to a single read.

13. The method according to claim 11, wherein at least one compressed GOP offset table padding packet being preceded by a pack header having a system clock reference (SCR), and further comprising: a standard PES header, an offset table signature, a starting timecode field, and a starting GOP address field.

14. The method according to claim 13, wherein each said GOP header entry further comprises: a field for number of frames within a prior GOP, and a field for a GOP address offset having an offset address of the pack header corresponding to the GOP header, for re-synchronizing an MPEG player/decoder clock prior to decoding of the GOP offset table, and for reconstructing the timecode and address offset of each GOP header during decompression and decoding by the MPEG player/decoder, by adding the number of frames and address offset of each GOP header entry to the starting timecode and starting GOP address, respectively, and for allowing random access of each individual video frame in play-from-offset mode.

15. The method according to claim 13, further comprising a step for adjusting the SCR backwards in time, after the GOP offset table insertion, for maintaining proper system timing.

* * * * *